(12) United States Patent
Karaoguz et al.

(10) Patent No.: US 8,238,324 B2
(45) Date of Patent: Aug. 7, 2012

(54) METHOD AND SYSTEM FOR NETWORK AWARE VIRTUAL MACHINES

(75) Inventors: Jeyhan Karaoguz, Irvine, CA (US);
Bruce Currivan, Dove Canyon, CA (US); Wael William Diab, San Francisco, CA (US); Yongbum Kim, San Jose, CA (US); Kenneth Ma, Cupertino, CA (US); Michael D. Johas-Teener, Santa Cruz, CA (US)

(73) Assignee: Broadcom Corporation

( * ) Notice: Subject to any disclaimer, the term of this patent is extended or adjusted under 35 U.S.C. 154(b) by 324 days.

(21) Appl. No.: 12/624,137

(22) Filed: Nov. 23, 2009

(65) Prior Publication Data

US 2011/0019552 A1 Jan. 27, 2011

Related U.S. Application Data

(60) Provisional application No. 61/228,394, filed on Jul. 24, 2009.

(51) Int. Cl.
*H04L 12/28* (2006.01)

(52) U.S. Cl. ........................................................ 370/351

(58) Field of Classification Search .................. 370/351, 370/389, 392, 400, 401; 709/223, 227, 228, 709/230–232, 238–244
See application file for complete search history.

(56) References Cited

U.S. PATENT DOCUMENTS

| | | | | |
|---|---|---|---|---|
| 6,084,855 A * | 7/2000 | Soirinsuo et al. | ............ | 370/235 |
| 6,760,775 B1 * | 7/2004 | Anerousis et al. | ............ | 709/238 |
| 7,123,620 B1 * | 10/2006 | Ma | ............ | 370/395.32 |
| 7,496,661 B1 * | 2/2009 | Morford et al. | ............ | 709/224 |
| 7,515,589 B2 * | 4/2009 | Bacher et al. | ............ | 370/392 |
| 7,613,132 B2 * | 11/2009 | Tripathi et al. | ............ | 370/255 |
| 7,630,368 B2 * | 12/2009 | Tripathi et al. | ............ | 370/389 |
| 7,843,843 B1 * | 11/2010 | Papp et al. | ............ | 370/252 |
| 7,941,539 B2 * | 5/2011 | Tripathi et al. | ............ | 709/226 |
| 2005/0138620 A1 * | 6/2005 | Lewites | ............ | 718/1 |
| 2006/0070066 A1 * | 3/2006 | Grobman | ............ | 718/1 |
| 2008/0159288 A1 * | 7/2008 | Nagarajan et al. | ............ | 370/392 |
| 2008/0192629 A1 * | 8/2008 | Chari | ............ | 370/230 |

OTHER PUBLICATIONS

"Stream Reservation Protocol" Wikipedia, the free encyclopedia; http://en.wikipedia.org/wiki/Stream_Reservation_Protocol, Captured Mar. 12, 2012 (1 page).

(Continued)

*Primary Examiner* — Dmitry H Levitan
(74) *Attorney, Agent, or Firm* — Brinks Hofer Gilson & Lione

(57) ABSTRACT

A virtual machine running on an endpoint device may encode a mark comprising routing parameters within one or more packets of a packet stream to indicate services and/or costs to be utilized in processing and/or communicating the packet stream. The virtual machine may communicate the packet stream to another network device. The routing parameters within the marks may indicate device capabilities, service class, quality measurements, latency and/or power usage. The routing parameters may comprise costs that may indicate capacity, efficiency and/or performance of power usage, bandwidth, absolute and/or relative latency, frame-drop eligibility, memory and processing. The packet stream is received and inspected to identify the marks and/or routing parameters. A virtual machine may be initialized and/or configured to process and/or communicate the packet stream based on the routing parameters. Routing may utilize based SPB, TRILL, and/or AVB.

20 Claims, 5 Drawing Sheets

OTHER PUBLICATIONS

"Media Access Control (MAC) Bridges and Virtual Bridge Local Area Networks" IEEE, Aug. 31, 2011 (1365 pages).
"IEEE 802.1Q" Wikipedia, the free encyclopedia; http://en.wikipedia.org/wiki/IEEE_802.1Q, Captured Mar. 12, 2012 (3 pages).
"Timing and Synchronization for Time-Sensitive Applications in Bridged Local Area Networks" IEEE, Mar. 30, 2011 (292 pages).
"Audio Video Bridging" Wikipedia, the free encyclopedia; http://en.wikipedia.org/wiki/Audio_Video_Bridging, Captured Mar. 12, 2012 (10 pages).
"IEEE 802.1aq" Wikipedia, the free encyclopedia; http://en.wikipedia.org/wiki/Audio_Video_Bridging; Captured Mar. 12, 2012 (19 pages).
"IEEE 802.1" Wikipedia, the free encyclopedia; http://en.wikipedia.org/wiki/IEEE_802.1; Captured Mar. 2, 2012 (5 pages).

* cited by examiner

| Start of Packet 302 | MAC Destination Address 304 | MAC Source Address 306 | VLAN Tag 316 | Ether-type 310 | Mark 312 | Stream ID 314 | L3 Header and Payload 308 | End of Packet 310 |

Routing Parameters Mark

METHOD AND SYSTEM FOR NETWORK AWARE VIRTUAL MACHINES

CROSS-REFERENCE TO RELATED APPLICATIONS/INCORPORATION BY REFERENCE

This application makes reference to, claims priority to, and claims the benefit of U.S. Provisional Application Ser. No. 61/228,394, filed on Jul. 24, 2009.

This patent application makes reference to:
U.S. patent application Ser. No. 12/571,147, filed on Sep. 30, 2009, which is hereby incorporated herein by reference in its entirety;
U.S. patent application Ser. No. 12/571,165, filed on Sep. 30, 2009, which is hereby incorporated herein by reference in its entirety;
U.S. patent application Ser. No. 12/571,296 filed on Sep. 30, 2009;
U.S. patent application Ser. No. 12/581,741, filed on Oct. 19, 2009, which is hereby incorporated herein by reference in its entirety;
U.S. patent application Ser. No. 12/604,968, filed on Oct. 23, 2009, which is hereby incorporated herein by reference in its entirety; and
U.S. patent application Ser. No. 12/709,993 filed on Feb. 22, 2010.

Each of the above stated applications is hereby incorporated herein by reference in its entirety.

FIELD OF THE INVENTION

Certain embodiments of the invention relate to communication systems. More specifically, certain embodiments of the invention relate to network aware virtual machines.

BACKGROUND OF THE INVENTION

The growth of networking and systems' connectivity are some of the major developments in recent decades. Fewer and fewer systems and devices are operated as stand-alone entities, and most of today's systems are increasingly becoming elements in complex networks. This growth in networking allows improved performance and increased flexibility. For example, network devices such as personal computers (PCs) including laptops, data center compute servers including blade servers, printers, routers, switches, voice communication devices, including VoIP phones, video and/or audio devices such as HDTV and audio amplifiers, gaming devices and other devices, are connected together as nodes in communication networks. Networks are designated in a variety of ways, and based on a variety of factors. Network designation may be spatial, based on the scope of connectivity among the network nodes. For example, a network may be designated as a personal area network (PAN), a local area network (LAN), and wide area network (WAN). Network designation may also be based on the backbone connecting technology. For example, a network may be designated as an Ethernet network, a wireless network, and/or a fiber optical network. Some networks are circuit switched and are built around dedicated node-to-node connectivity, wherein a dedicated circuit is created and reserved, when needed, between the communicating nodes. Other nodes are then barred from utilizing the same connection and/or other entities in the network to the extent necessary to maintain the circuit. When such dedicated connectivity is used, implicit requirements for underlying services, for example, type of service, QoS, latency requirements and/or bandwidth provisioning may be met by prior provisioning of the connections. Most networks in use nowadays, however, are based on packet switched networks. In packet switched networks, the sending node simply transmits traffic that is destined for one or more receiving nodes. The traffic comprises packets that contain, in addition to data, other information that enables directing the packets to the receiving nodes. For example, most of today's networks are Internet based networks and utilize various protocols comprising TCP/IP, for example, to facilitate packet switching. In this regard, data is encapsulated into packets that comprise a header portion and a payload portion to enable transporting, addressing and/or routing among various entities within or coupled to the network.

Network infrastructure devices, comprising, for example, switches, routers, hubs and/or wireless access points, are utilized in networks to facilitate forwarding of traffic between sending and receiving nodes. Hubs contain multiple ports, wherein packets arriving at one port are transmitted via all remaining ports. Consequently, hubs are generally operable to perform minimal processing. Switches also comprise multiple ports, but unlike hubs, switches are more actively functional in performing routing operations. For example, switches maintain routing information that enable the switches to determine whether the packets are transmitted via the switch, and if so, to determine the appropriate ports to perform that transmission. Switches may store, generate, and/or maintain addressing related information of accessible network nodes.

Some network infrastructure devices, however, may block traffic. Blocking occurs when a switch reaches a point where it is unable to perform additional switching even though it has not reached its theoretical maximum throughput, which generally is based on the combined maximum speeds of all of its ports.

Computer architecture has evolved not only with regard to higher performance CPUs, but also to provide virtualization such that each physical computer may run multiple operating systems and each operating system may embody one or more related or unrelated applications. In this regard, each instance of an operating system and/or each instance of an operating system with a set of one or more applications may be referred to as a virtual machine. In addition, a plurality of virtual machines may be managed by a central control application, which may be referred to as a hypervisor. A hypervisor may create, run, and delete VMs. Also, a hypervisor may handle resource management such as memory, processor resources, network connectivity and/or control management, such as, start, stop, pause, trace and/or re-start.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method network aware virtual machines, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
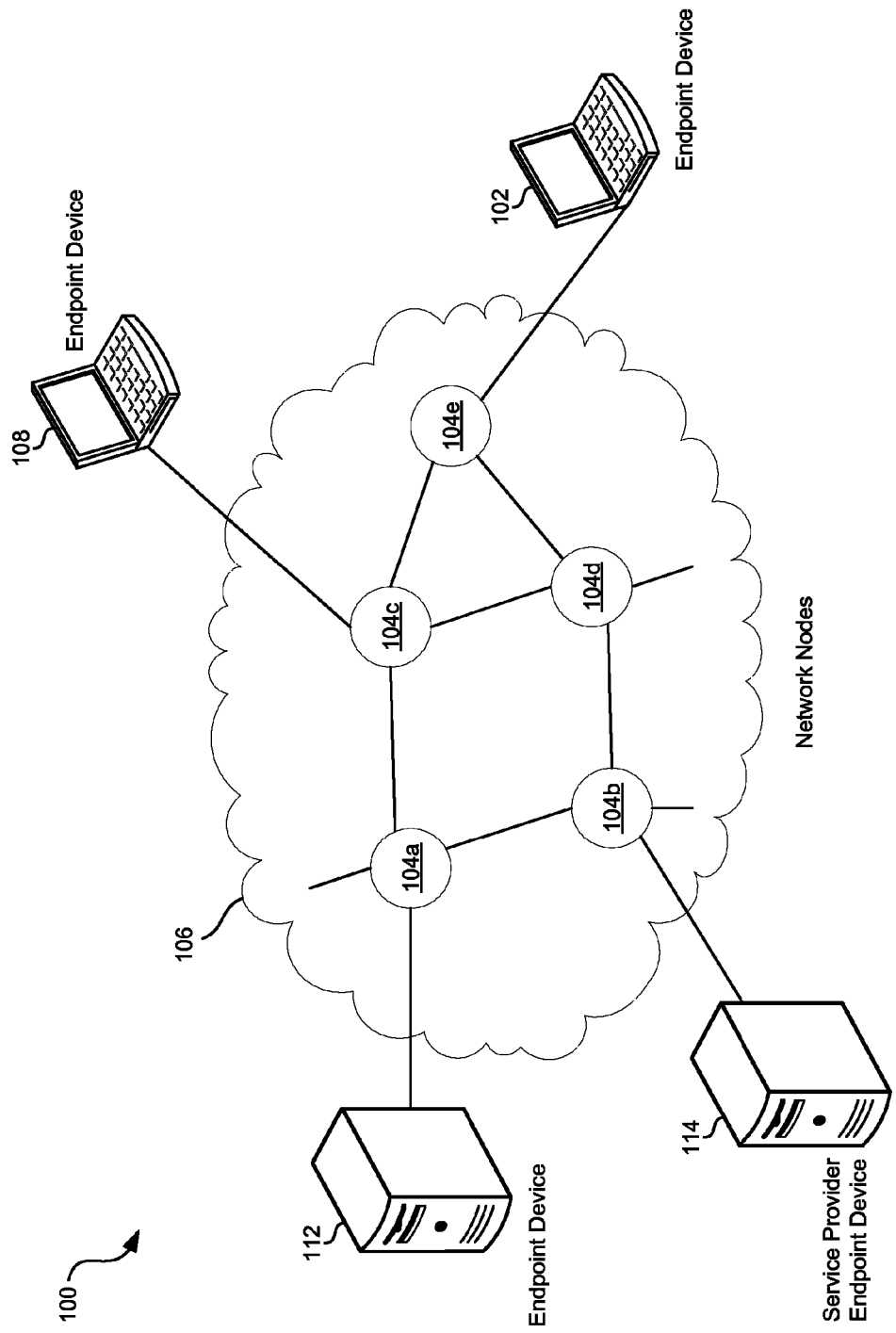
FIG. 1 is a diagram illustrating a network in which the delivery of information may be controlled based on marked packets generated from an endpoint device, in accordance with an embodiment of the invention.

Certain embodiments of the invention can be found in a method and system for network aware virtual machines. In various embodiments of the invention, a virtual machine running on a network device may be operable to encode a mark comprising one or more routing parameters within one or more initial packets of a packet stream. The routing parameters and/or the mark may indicate services and/or costs to be utilized for processing and/or communicating the packet stream. The virtual machine may communicate the one or more initial packets and/or the packet stream to another network device. The initial packets of the packet stream and/or one or more other packets of the packet stream may be marked by one or more of an endpoint device, a client and/or a service provider of the network. The marks may comprise information indicating endpoint device capabilities, service class, quality measurements, latency requirements and/or power usage requirements, for example. Notwithstanding, the invention is not so limited and may utilize any suitable information. The marks may comprise user information. The costs may comprise information for capacity, efficiency and/or performance of one or more of power usage, bandwidth, absolute and/or relative latency, frame-drop eligibility, memory and processing, for example, however, the invention is not so limited. The initial packets and/or the packet stream may be received by another network device and may be inspected to identify the marks comprising the routing parameters that may indicate services and/or costs. The indicated services and/or costs may be utilized for processing and/or communicating the initial packet and/or the packet stream, for example, by another network device. A virtual machine may be initialized and/or configured to process and/or communicate the initial packets and/or the packet stream based on the marks, the routing parameters and/or the indicated services and/or costs. A route may be determined for communicating the initial packets and/or the packet stream based on shortest path bridging, TRILL, and/or audio video bridging. A virtual machine may implement a firewall for the one or more initial packets and/or the packet stream.

In an exemplary embodiment of the invention, based on the mark and/or the routing parameters, a route may be determined for the initial packets and/or the packet stream based on standardized and/or non-standardized protocols. For example, IEEE 802.1aq Shortest Path Bridging (SPB) may be utilized and/or an Internet Engineering Task Force (IETF) standard on Transparent Interconnection of Lots of Links (TRILL) may be utilized. Furthermore the suite of protocols collectively known as Audio Video Bridging (AVB) and extensions there of may be utilized. For example, IEEE P802.1AS—IEEE Standard for Local and Metropolitan Area Networks—Timing and Synchronization for Time-Sensitive Applications in Bridged Local Area Networks, IEEE P802.1 Qat—IEEE Standard for Local and Metropolitan Area Networks: Virtual Bridged Local Area Networks—Amendment 9: Stream Reservation Protocol (SRP) and IEEE P802.1Qav may be utilized for determining routes.

FIG. 1 is a diagram illustrating a network in which the delivery of information may be controlled based on marked packets generated from an endpoint device, in accordance with an embodiment of the invention. Referring to FIG. 1, there is shown a communication system 100 comprising network devices 102, 108, 112 and 114 which communicate via the network infrastructure 106. The network infrastructure 106 may comprise the network devices 104a, 104b, 104c and 104d that are collectively referred to herein as the network devices 104 and/or the network nodes 104.

Each of the network devices 102, 108, 112 and 114 that may be referenced herein as endpoint devices 102, 108, 112 and 114 and/or end-systems 102, 108, 112 and 114 may comprise suitable logic, circuitry, interfaces, and/or code that may be operable to implement OSI layers 1 through 7. In this regard, the endpoint devices 102, 108, 112 and/or 114 may be operable to run one or more virtual machines that may generate, store, transmit, and/or receive data communicated via the network infrastructure 106. Various protocols may be utilized for generating the data and formatting, packetizing, and/or otherwise processing the data as it is conveyed down through an OSI stack. In various embodiments of the invention, the network devices 102, 108, 112 and/or 114 may be, for example, handheld communication devices, laptops and/or servers. One or more of the network devices 102, 108, 112 and 114 and/or the network devices 104a, 104b, 104c and 104d may be operated by a service provider. For example, the endpoint device 114 may be a video server operated by a service provider. In this regard, one or more endpoint devices, for example, the endpoint devices 102 and/or 108 may be owned by subscribers of the video service. The service provider may provide video services to the subscribers and/or to the endpoint devices 102 and/or 108 based on service agreements. Furthermore, the end point device 112 may be a storage server, for example. In this regard, a single networked VM may be created from the endpoint devices 114 and 112 to provide video services that meet a particular set of parameters, bandwidth, protocol, priority and/or DRM, for example, to a set of subscribers that may utilize the endpoint devices 102 and 108 for example.

Each of the network devices 104 may comprise suitable logic, circuitry, interfaces and/or code that may be operable to perform routing, switching and/or communication operations based on one or more OSI networking layers. In various embodiments of the invention, the network devices 104 may be operable to perform OSI L2, L3 and/or higher layer operations. The communication devices 104 may also be operable to determine a preferred method and/or configuration for processing and/or routing data based on mark information within the data that may be read by one or more of the network devices 104. In this regard, packets comprising data may be processed and/or routed based solely on an associated mark. Furthermore, the network devices 104 may be operable to spawn one or more processes, one or more dynamic machines and/or one or more virtual machines (VM) in order to process and or route the data based on the mark information. Exemplary network devices 104 may comprise wired, wireless and/or optical routers, switches, access points and/or base stations, for example. The network infrastructure 106 may comprise the network devices 104. The network devices 104 may be referred to as network infrastructure devices.

In operation, two or more of the end point devices 102, 108, 112 and 114 may be operable to exchange data via the network infrastructure 106. For example, a datastream may be generated and packetized in the endpoint device 112 and the resulting packets may be communicated across the network to the endpoint device 102. In this regard, the endpoint device 112 may transmit the packets to the network device 104*a* which may inspect the packet to determine how to service or handle the packet. For example, packet inspection may be utilized by the network devices 104 to determine routing parameters such as latency requirements, a service class associated with the packets, a type of data within the packets, a quality of service required by the packets and/or protocols utilized in generating the packets. Based on the packet inspection, the network devices 104 may be operable to determine how to service or handle the packets. Determining how to service or handle the packets may comprise, for example, determining one or more processes, dynamic machines and/or virtual machines to use. Furthermore, processing cycles, memory for buffering, which queue(s) to use for buffering and/or how long to buffer the packets may be determined. Which links to use for forwarding the packets, data rates and/or whether to utilize packet preemption and/or real time compression may also be determined. In addition, whether and/or when the network device 104 may operate in an energy saving mode may be determined.

In conventional network devices, packet inspection may comprise inspecting information associated with each OSI layer sequentially. For example, after OSI layer 2 information is inspected, the layer 2 information may be stripped off and the OSI layer 3 information may be inspected and the process may repeat inspecting and stripping off information for one or more of the OSI layers up to layer 7. Deep packet inspection may only provide best estimated service needs. Various aspects of the invention may enable marking packets at OSI layer 2 and/or higher layers for example. For example, virtual machines in the end point devices, 102, 108, 112 and/or 114 may be operable to mark packets with routing parameters at OSI layer 2 and/or layer 3. In this regard, the network devices 104 may determine how the packets should be serviced or handled based on the routing parameters within the OSI layer 2 and/or higher layer mark information. In this manner, the determination of services and/or handling may be based on actual advertised service needs of the originating virtual machines.

Marks encoded within a packet may be referred to as tags, markings and/or embedded bits, for example. Additional information regarding packet tags and/or marks is provided in the following patent applications: U.S. patent application Ser. No. 12/581,741, filed on Oct. 19, 2009; U.S. patent application Ser. No. 12/604,968, filed on Oct. 23, 2009; U.S. patent application Ser. No. 12/571,147, filed on Sep. 30, 2009; and U.S. patent application Ser. No. 12/571,165, filed on Sep. 30, 2009.

Applications running on one VM may have little relationship to applications running on other VMs that may reside on the same endpoint device or physical server and/or may be managed by the same hypervisor. Thus, traffic generated by a single server or endpoint device, for example, the endpoint device 114, which may host multiple VMs, may have varying requirements for routing of frames from the various VMs, even when the frames comprise the same traditional priority codes. For example, an endpoint device may generate and communicate voice traffic, uncompressed video traffic and financial transactions traffic. Each may be assigned a high priority traditional priority code, however, each may have a different latency requirements and/or different reliability requirements. For example, the uncompressed video may have a more stringent latency requirement than the voice and the voice may have a higher latency requirement than the financial transactions. Furthermore, the financial transactions may be more sensitive to losing frames of data and may require a higher standard of reliability when communicating data through the network infrastructure 106. Routing parameters may indicate what level of latency, reliability and/or other requirements or conditions should be met when communicating each type of traffic. In this regard, packets marked with routing parameters by a VM may enable devices within the network infrastructure 106 to differentiate offered services based on a specific VM.

In various embodiments of the invention, network aware VMs that may be hosted in networked endpoint devices 102, 104, 106 and/or 108, may communicate VM communication requirements to the network infrastructure devices in finer terms than just priority code points. The terms may comprise routing parameters, for example, absolute latency and/or end-to-end latency, bandwidth, persistency of connection, tolerance to frame loss, fault tolerance level, security, device and network identity, energy efficiency and other network infrastructure services that a VM may be aware of and may specify. The network infrastructure devices 106 may be operable to honor the specified communication requirements based on the routing parameters and may provide a specified type of service upon receipt of the routing parameters comprising communication requirements from the VM.

Figure 2:
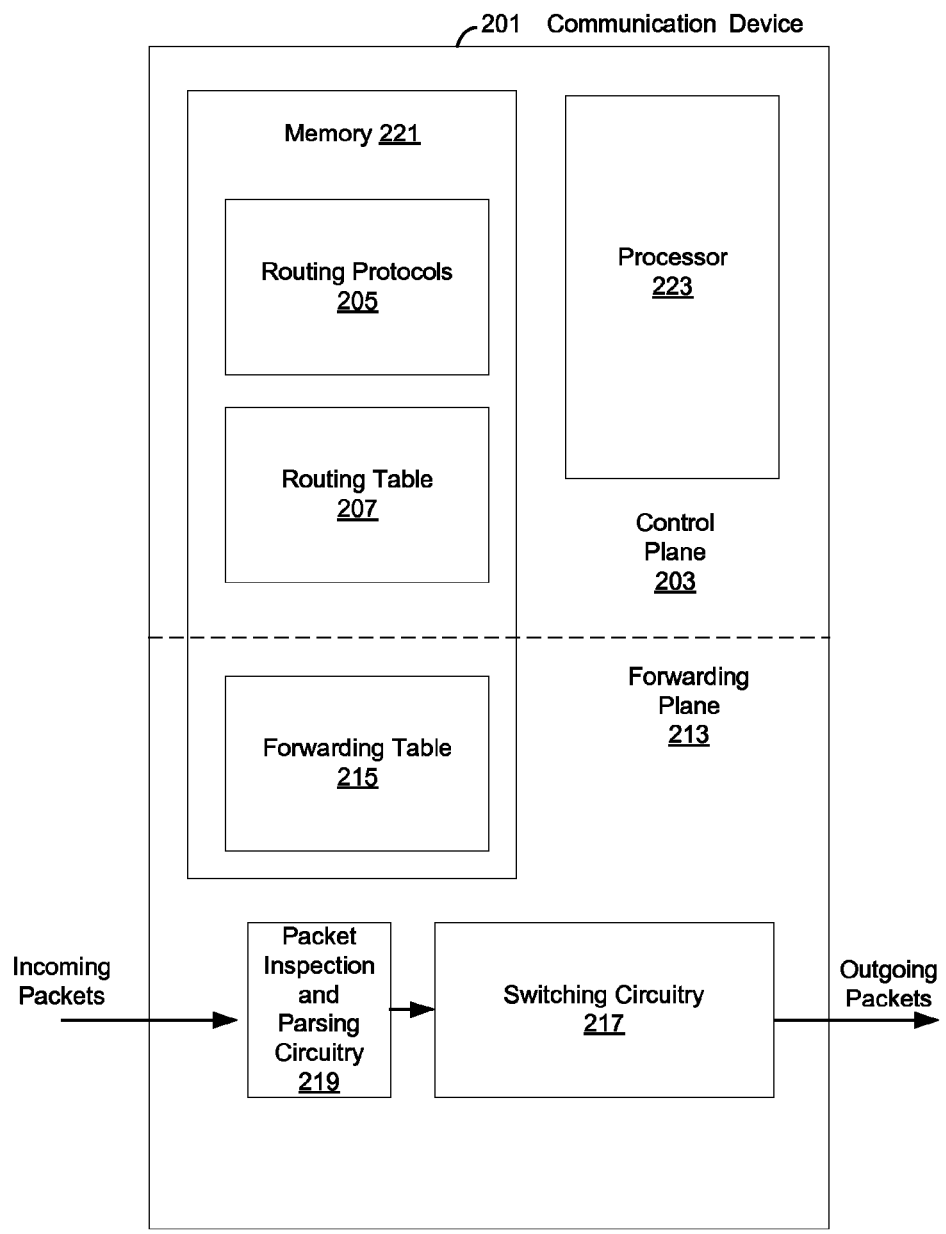
FIG. 2 is a block diagram that illustrates an exemplary network infrastructure device that is operable to process and/or communicate packets based on markings encoded by a virtual machine within a packet, in accordance with an embodiment of the invention.

FIG. 2 is a block diagram that illustrates an exemplary network infrastructure device that is operable to process and/or communicate packets based on markings within the packets, in accordance with an embodiment of the invention. Referring to FIG. 2, there is shown a network device 201, a processor 223, a memory 221, a control plane 203, routing protocols 205, a routing table 207, a forwarding plane 213, a forwarding table 215, packet inspection and parsing circuitry 219, and a switching circuitry 217.

The network device 201 comprises suitable logic, circuitry, interfaces and/or code that may be operable to route packets and/or to forward data received from one network device to another network device. The network device 201 may be operable to utilize packets marked with routing parameters by, for example, virtual machines in endpoint devices to route and/or to switch packets and to provide network services based on marks within the packets. In this regard, the network device 201 may be a network node similar to and/or substantially the same as the network devices 104 and/or may be an endpoint device that may be similar and/or substantially the same as the endpoint devices 102, 108 and 112 described with respect to FIG. 1. Routing operations within the network device 201 may be performed based on one or more OSI model networking layers. In addition, routing operations performed by the network device 201 may be based on information communicated to the network device 201 via marks that may be embedded within one or more packets and/or a stream of packets. The mark information may indicate a preferred method for processing and/or routing the packets and/or packet stream and/or may indicate requirements for optimal communication of the data. For example, a packet may comprise a mark that may indicate a service class and/or latency requirements associated with the data. Moreover, when making routing decisions, the network device 201 may be operable to utilize a plurality of routing parameters and/or costs associated with one or more network devices that may be candidates for routing the data through a network, for example.

In various embodiments of the invention, the network device 201 may be operable to execute one or more processes, dynamic machines and/or virtual machines that may be operable to process and/or route packets based according to the mark information. In this regard, various routing parameters may be configured for the processes, dynamic machines and/or virtual machines. For example, processing cycles and/or time slices may be assigned, queues and/or memory may be allocated, deallocated and/or configured, ports and/or links may be assigned and/or reassigned, data rates and/or latency may be determined, and/or processing such as packet preemption, real time compression and/or energy savings mode may be configured. The network device 201 and/or the one or more processes, dynamic machines and/or virtual machines may be implemented on a single chip, using a chipset, on a single device and/or a plurality of devices, for example.

The control plane 203 may comprise suitable logic, circuitry, interfaces and/or code that may be operable to determine how the network device 201 will handle packets that are received and forwarded via the forwarding plane 213. The control plane 203 may be operable to determine that a packet may be discarded or that a packet may receive a specified quality of service. The control plane 203 comprises routing protocols 205 that may specify how the network device 201 communicates with other network devices and/or how routes are selected, for example. In addition, the routing protocol 205 may determine how a routing table is constructed. Exemplary routing protocols 205 comprise interior gateway routing protocol (IGRP), open shortest path first (OSPF), routing information protocol (RIP) and intermediate system to intermediate system (IS-IS). The control plane 203 may also comprise the routing table 207 that may comprise routes to particular network destinations.

The control plane 203 may be operable to implement shortest path bridging (SPB), Transparent Interconnection of Lots of Links (TRILL), and/or audio video bridging (AVB), for example. In this regard, the network device 201 may be operable to route packet data based on a desired path cost and/or a desired quality of service (QoS). For example, the network device 201 may be operable to route data via a least cost path and/or a shortest path wherein the path utilized for routing the data may be AVB enabled. Furthermore, the network device 201 may be operable to monitor other network nodes which may be AVB enabled and may be operable to establish a route via AVB enabled network nodes. U.S. patent application Ser. No. 11/963,017, which was filed on Dec. 21, 2007 and U.S. patent application Ser. No. 11/963,087, which was filed on Dec. 21, 2007 discloses SPB and/or AVB routing protocol, and are each hereby incorporated herein by reference in its entirety.

The control plane 203 may be operable to utilize one or more routing parameters when determining routes and/or handling packet data. For example, parameters may enable packet preemption, quality measurements and/or reporting of quality measurements, tier bypass and/or power and/or resource efficiency. Various routing parameters are described with respect to FIG. 2.

The control plane 203 functions may be implemented by one or more processes, dynamic machines and/or virtual machines. In this regard, the control plane 203 may be operable to route packets and/or may configure circuitry according to mark information received in packets. For example, the packets may comprise one or more marks that may indicate how to process and/or how to route the packets. The mark information may indicate that one or more packets may be given higher priority for delivery over other packets that may be pending delivery. Accordingly, the packets given a higher priority may have a lower latency requirement and may preempt delivery of other packets. Also, processing and/or treatment of packet data that is routed through the network device 201 may depend on a type of virtual machine and/or device that may have originated the packet data. For example, real time voice streams and/or interactive gaming played over a network may each require a specified bandwidth, latency and/or other criteria that may be specified in a mark. In another example, inter-process messaging for example, semaphore and/or L2 and/or L3 cache over a network may be handled based on various criteria that may be specified by routing parameters within a mark in a packet. For example, the mark may specify network burst bandwidth, latency, comprising, for example, minimizing a number of network switch and/or router hops, and/or an intended destination virtual machine. The mark may indicate utilization of certain parameters for routing the data and/or for configuring a process, dynamic machine and/or virtual machine to handle the routing of the specified type of data. Furthermore, a mark may indicate that data routed for a particular user may be handled and/or routed according to a specified service class that may be associated with the user. The marks may also specify optional features that, whenever and/or wherever available, may provide optimal processing and/or routing of corresponding packets. For example, a tier bypass feature may be configured in a network wherein packets are usually communicated from a first tier of network devices via a second tier of network devices to a third tier of network devices. In instances when mark information within a packet indicates that tier bypass may be utilized for communicating the packet, the packet may be communicated from the first tier directly to the third tier. In this manner latency in end to end communication may be reduced. Marks and/or tags are further described with respect to FIG. 3.

The control plane 203 may also be operable to route data based on one or more costs associated with one or more network devices that may be candidates for a packet delivery route. The costs may comprise factors such as power usage, bandwidth availability, memory availability, processing capabilities, energy efficiency, shortest path bridging availability and/or audio video bridging availability.

The forwarding plane 213 may comprise suitable logic, circuitry, interfaces and/or code that may be operable to accept a packet arriving on an incoming link, look up a destination address for the incoming packet and determine an internal path through the switching circuitry 205 that will direct the packet outward via a proper outgoing link. In this regard, marks in the incoming packets may be parsed by the packet inspection and parsing circuitry 219. Mark information as well as cost factors that may be determined in the control plane 203, for example, may be utilized in the forwarding process. One or more functions of the forwarding plane 213 may be implemented by one or more spawned processes, dynamic machines and/or VMs. For example, one or more VMs may be operable to encapsulate outgoing packets and set various packet fields. In this regard, the VM may modify a field for packet preemption, real time compression and/or for quality measurements, for example. Also, the VM implementing the forwarding plane 213 may update a check sum.

The switching circuitry 217 may comprise suitable logic, circuitry, interfaces and/or code that may be operable to direct packets received from an incoming link to one or more outgoing links. The switching circuitry 217 may comprise, for example, input queuing and output queuing. In addition, the switching circuitry 217 may comprise a subsystem which may comprise suitable logic, circuitry, interfaces, and/or code that may enable exchange of data and/or messaging via a plurality of physical interconnects.

The memory 221 may comprise suitable logic, circuitry, interfaces and/or code that may be operable to store packet data, instructions and/or parameters that enable functionality described with respect to the control plane 203 and/or the forwarding plane 213. In this regard, one or more portions of the memory 221 may be allocated for the one or more of spawned processes, dynamic machines and/or VMs and/or for packet data and/or routing parameters. For example, the memory 221 may be operable to store routing parameters, costs associated with one or more network devices and/or tag data from packets pending delivery. The memory 221 may be operable to store packet data that may be received and/or forwarded by the network device 201. Moreover, the memory 221 may store one or more routing tables, for example, the routing table 207. The routing table 207 may comprise routing information that may be sent to the forwarding table 215 in the forwarding plane 213. The routing information may comprise preferred routes chosen by a routing algorithm, for a specified processes, dynamic machine and/or VM, for example, according to various routing parameters, costs and/or mark information for forwarding packets. The memory 221 may be communicatively coupled to the processor 223 and/or the switching circuitry 217.

The processor 223 may comprise suitable logic, circuitry, interfaces and/or code that may be operable to execute instructions and/or utilize parameters that may enable functionality described with respect to the control plane 203 and/or the forwarding plane 213. In this regard, the processor 223 may be operable to handle the one or more spawned processes, dynamic machines and/or VMs that may implement the control plane 203 and/or the forwarding plane 213 functionality. The processor 223 may manage the communication of packets based on one or more routing protocols that may be implemented by the one or more spawned processes, dynamic machines and/or VMs, for example, the routing protocols 205. In addition, the processor 223 may receive information from mark data, other routers and/or other network devices and may utilize the received information to construct one or more routing tables such as the routing table 215. Moreover, the processor 223 may be operable to receive and/or utilize information based on routing parameters and/or costs of one or more other network nodes when making routing decisions. For example, the processor 223 may receive and/or utilize information regarding a user device, a source VM data type, a user service class, packet preemption, quality measurements, tier bypass, power efficiency and/or resource availability. The processor 223 may be communicatively coupled to the memory 221 and/or the switching circuitry 217.

In operation, the network device 201 may utilize one or more processes, dynamic machines and/or VMs to perform network operations based on marked data from packets and/or streams of packets that are pending delivery. The network device 201 and/or the one or more spawned processes, dynamic machines and/or VMs may be utilized, for example, in a local area network (LAN), to enable transfer of traffic packets between network nodes in the LAN. For example, in instances where received traffic packets are TCP/IP traffic packets, the IP headers may be parsed to determine the source and/or destination addressing information for the received traffic packets. Once the destination nodes are determined, based on one or more routing tables maintained by the one or more spawned processes, dynamic machines and/or VMs in the memory 221, for example, the packets may be transmitted via the forwarding.

The network device 201 may be operable, for example, to maintain routing information that may enable mapping of a set of destination addresses corresponding to various network nodes, to a plurality of outgoing links in the network device 201. The routing information may be stored, generated, and/or maintained by the one or more spawned processes, dynamic machines and/or VMs implemented by the processor 223 of the network device 201, for example. Once the appropriate outgoing links are determined for a received packet, the switching circuitry 217 may be utilized to transfer the packet to the appropriate outgoing links.

In various embodiments of the invention, the processor 223 and/or one or more spawned processes, dynamic machines and/or VMs running on the processor 223 may be operable to determine how to handle packet data based on capabilities and/or information from one or more packet destination network devices. The information may comprise various routing parameters, costs and/or packet mark data. In this regard, the information may enable support of user device capabilities, support of specified service classes, packet preemption, real time compression, quality measurements, tier bypass and/or power efficient communication. Furthermore, the information may comprise one or more of power consumption, bandwidth, memory and/or processing costs that may be associated with communicating via a specified device. The processor 223 and/or one or more spawned processes, dynamic machines and/or VMs may be operable to make routing decisions based on the information. For example, a route may be chosen for delivery of packet data based on a plurality of factors rather than based on a minimum number of hops, for example.

In an exemplary aspect of the invention, the network device 201 and/or one or more spawned processes, dynamic machines and/or VMs running on the network device 201 may be operable to communicate information regarding its own routing parameters and/or costs to one or more neighboring network devices. In addition, the network device 201 may be operable to receive similar information from one or more of its neighboring network devices and may make decisions about where, when and/or how to route the various types of traffic based on that information.

Figures 3A, 3B:
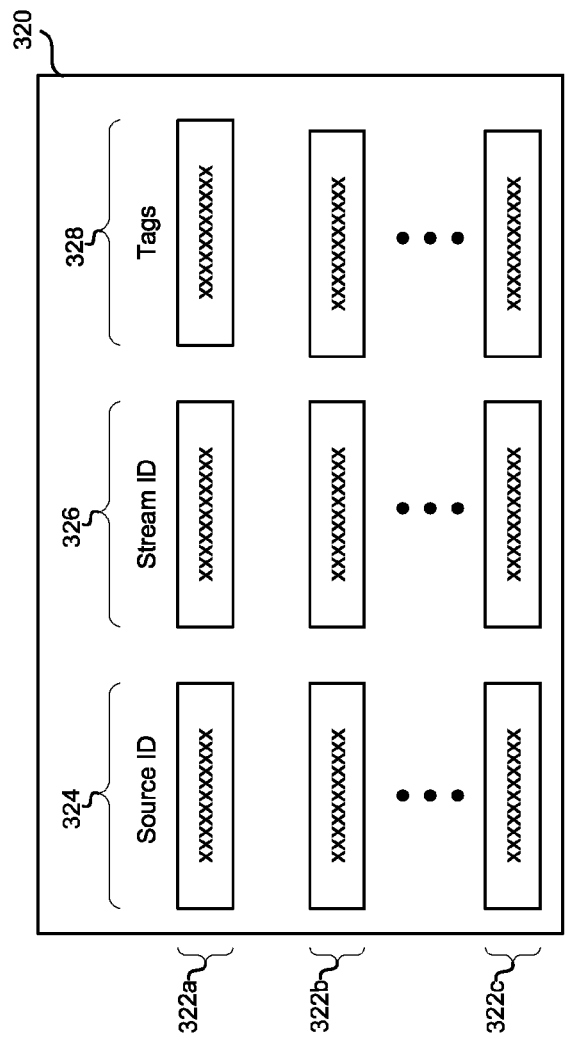
FIG. 3A is a block diagram illustrating an exemplary layer 2 packet comprising one or more marks, in accordance with an embodiment of the invention.
FIG. 3B is a block diagram illustrating an exemplary data structure for storing marks and/or parameters within a network device that are received within one or more packets, in accordance with an embodiment of the invention.

FIG. 3A is a block diagram illustrating an exemplary layer 2 packet comprising one or more marks, in accordance with an embodiment of the invention. Referring to FIG. 3A, there is shown a data packet 300 that may comprise a start of a packet header 302, a destination address header (DAH) 304, a source address header (SAH) 306, a payload 308, and an end of packet header 310, an optional VLAN tag 316, an Ethertype field 310, a mark 312, and a stream identifier (ID) 314.

The start of packet header 302 may comprise data that may indicate to a receiving communication device, for example, the communication 201 and/or one or more of the network devices 104, where the packet 300 begins. The DAH 304 may comprise data that may indicate which device is receiving the packet 300. The SAH 306 may indicate which communication device and/or which VM is transmitting the packet 300. The payload 308 may comprise packet data and/or headers for higher layer processing. The payload 308 may comprise data transmitted from an endpoint device, for example, the endpoint device 112, which may be stored in the endpoint device and/or generated by a VM running on the endpoint device. For example, the payload 308 may comprise virtual memory access over a network, CPU L2 or L3 cache, video conferencing streaming data, multi-party Internet gaming data, VOIP data and/or web browsing data. Accordingly, the payload 308 may require a specified level of latency in order to realize an acceptable quality of communication. Moreover, the payload 308 may require a specified class of service based on a service or subscriber agreement purchased by a user associated with the payload 308. The end of packet 310 may indicate to the receiving device where the packet 300 ends.

In an exemplary embodiment of the invention, a unique Ethertype 310 value may be utilized when a network aware virtual machine applies the mark 312 to the packet 300. In this regard, the mark 312 may denote services desired from network infrastructure, for example, from one or more of the network devices 104 and/or an endpoint device that may receive the packet 300. A network device that may receive the mark 312, may strip or preserve the mark 312 based on mark policy. In various embodiments of the invention, when the mark 312 is stripped, a standards based Ethertype value from the mark parameters may be placed in Ethertype 310.

The mark 312 may comprise bits embedded within the packet 300 and/or may be part of an OSI layer 2 and/or higher OSI layer header. For example, a VM executed by the endpoint device may originate communication of the payload 308 and/or may generate a mark in an OSI layer 2 or higher OSI layer header. In an exemplary embodiment of the invention, a service provider that may manage and/or operate the endpoint device 114 and/or one or more of the network devices 104, for example, may insert the mark 312 into the packet 300. For example, the service provider's mark may indicate a service class that a subscriber may have purchased. The service class may specify a bandwidth and/or latency that the subscriber's signed up for. In another exemplary embodiment of the invention, a service provider may insert a mark to indicate that the payload 308 comprises a particular type of data, for example, a real time video stream that may require, high bandwidth, real time compression and/or low latency when handled by the network devices 104 and/or the network device 201, for example. In this regard, virtual machine within a network device 104 and/or the network device 201 that may process and/or forward the packet 300, may be operable to provide services that are indicated by the mark 312.

The mark 312 and/or reserved bits, for example, may indicate criteria for processing and/or routing the packet 300 via one or more network nodes, for example, the communication device 201 and/or the network devices 104. In various embodiments of the invention, the one or more marks and/or reserved bits may correspond to various routing parameters, network node capabilities and/or costs associated with a specified communication device and/or network node. In this regard, the mark and/or reserved bits may indicate how the packet 300 may be processed, prioritized and/or routed.

In operation, one or more packets and/or a stream of packets comprising the packet 300 may be generated by an endpoint device, for example, one of the endpoint devices 102, 108 and/or 112. The endpoint device may have a certain capability and/or may host a VM that may generate the packet 300. For example, the packet 300 may be generated by a compute intensive VM in a data center that may comprise large networked database queries that may support a large amount of real-time transactions. The stream of packets may require a very low latency in order for the database queries to adequately communicate high speed input by a plurality of database clients. The endpoint device may generate the mark 312 that may indicate the endpoint device multi-party real-time database capability. In this regard, a network node, for example, the communication device 201 and/or one or more of the network devices 104 may receive the packet 300 and may parse the packet and/or may perform packet inspection in order to determine the endpoint device database capabilities. For example, the communication device 201 may be operable to inspect the mark 312 and may determine that the packet 300 comprises real-time database capability and/or requires very low latency communication. Accordingly, the network device 201 and/or one or more of the network devices 104 may be a part of a networked virtual machine (VM) using the packet 300 and/or the corresponding real-time database queries according to information in the mark 312 and/or the packet 300.

The process, dynamic machine and/or VM may determine a path for routing the packet 300 based on one or more routing parameters that may be stored within the device. For example, the process, dynamic machine and/or VM may route packets based on shortest path bridging and/or may utilize AVB. Furthermore, the process, dynamic machine and/or VM may perform real time compression on the packet 300 data that may reduce the packet size by a factor of 2. The process, dynamic machine and/or VM may also preempt one or more other packets that may be pending delivery by the device 201 so that the multi-party interactive Internet gaming data from the packet 300 may be communicated with very low latency, for example.

FIG. 3B is a block diagram illustrating an exemplary data structure for storing marks and/or parameters within a network device that are received within one or more packets, in accordance with an embodiment of the invention. Referring to FIG. 3B there is shown a table 320 which may be stored in the memory 221 described with respect to FIG. 2. For each packet 300 and/or for each packet stream handled by a virtual machine in the network device 201, the table 320 may comprise a corresponding entry 322 that is stored therein. Each of entries that are stored in the table may comprise a source identification (ID) field 324, a stream identification field 326 and/or a mark field 328.

The source ID field 324 may comprise information that may indicate a source of a packet for example, the packet 300, and/or a source of a packet stream that may comprise one or more marks. The source may be an endpoint device and/or a virtual machine within such endpoint device, for example. The stream ID field 326 may identify each data stream. In an exemplary embodiment of the invention, multiple packet streams from a single endpoint device, VM and/or client may be uniquely marked. The mark field 328 may comprise information that informs a device receiving, processing and/or routing the packet and/or packet stream as to how to handle the packet and/or packet stream.

Figure 4:
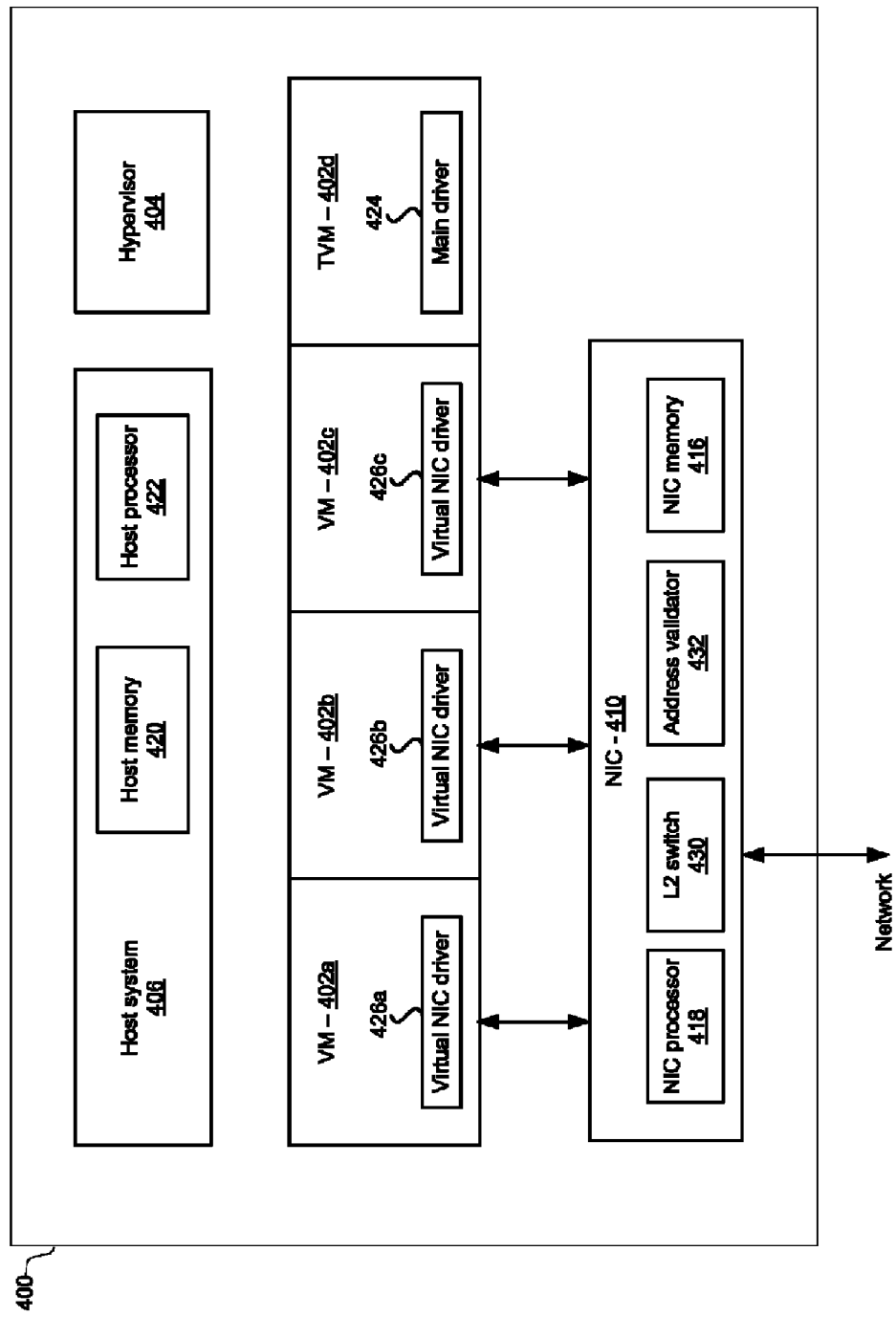
FIG. 4 is a block diagram of a network device comprising one or more virtual machines, in accordance with an embodiment of the invention.

FIG. 4 is a block diagram of a network device comprising one or more virtual machines, in accordance with an embodiment of the invention. Referring to FIG. 4, there is shown a network device 400 that may comprise one or more virtual machines (VMs) 402a, 402b, and 402c, a transfer virtual machine (TVM) 402d, a hypervisor 404, a host system 406, and a NIC 410. The TVM 402d may comprise a main driver 424. The host system 406 may comprise a host processor 422 and a host memory 420. The NIC 410 may comprise a NIC processor 418, a NIC memory 416, a L2 switch 430, and a physical address validator 432.

The network device 400 may be a device shown in the communication system 100, for example, one of the network devices 104 in the network infrastructure 106 and/or one of the endpoint devices 102, 108, 112 and/or 114, described with respect to FIG. 1. Furthermore, the network device 400 may be operable to perform functions described with respect to the network device 201, which is described with respect to FIG. 2. The network device 400 may be operable to generate, handle and/or process the packet 300 and/or may be operable to configure and/or store information in the data structure 320, described with respect to FIGS. 3A and 3B respectively, for example.

The host system 406 may comprise suitable logic, circuitry, interfaces, and/or code that may be operable to process data and/or perform network communication and/or routing operations, for example. The host system 406 may support operation of one or more VMs via the hypervisor 404, for example, the VMs 402a, 402b, and 402c. The VMs 402a, 402b, and 402c may each correspond to an operating system, for example, that may be operable to run and/or execute one or more VMs, for example, a VM executing a data center, a video server, voice and/or gaming applications. In this regard, the VMs 402a, 402b and/or 402c may be operable to mark packets with routing parameters, for example, may be operable to encode the packet 300 with the mark 312. Alternatively, one or more of the VMs 402a, 402b, and 402c may be operable to run one or more communication services, for example, web service, a router, a firewall, and/or a virtual private network concentrator, for example. The number of VMs that may be supported by the host system 406 and/or the hypervisor 404 need not be limited to any specific number. For example, one or more VMs may be supported by the host system 406. Internal switching may occur between VMs or between a VM and the TVM 402d.

The hypervisor 404 and/or the TVM 402d may operate as a software layer that may enable virtualization of hardware resources in the host system 406 and/or virtualization of hardware resources communicatively connected to the host system 406, such as the NIC 410, for example. The hypervisor 404 and/or the TVM 402d may allocate hardware resources that may be distributed over a network and also may enable data communication between the VMs and hardware resources in the host system 406 and/or hardware resources communicatively connected to the host system 406. For example, the hypervisor 404 may enable communication between the VMs supported by the host system 406 and the NIC 410. In instances where a VM is engaged in network transmission or reception, data may be communicated directly to and/or from the NIC 410 after the TVM 402d has allocated queues, internal resources required on the NIC 410 and/or has consulted configuration and administrative information for the NIC 410.

The TVM 402d may comprise a main driver 424 that may coordinate the transfer of data between the VMs. The main driver 424 may communicate with the virtual NIC driver 426a in the VM 402a, the virtual NIC driver 426b in the VM 402b, and/or the virtual NIC driver 426c in the VM 402c. Each virtual NIC driver may correspond to a portion of a VM that may enable transfer of data between the VMs, operations or services performed by the VMs and the appropriate queues via the main driver 424.

The host processor 422 may comprise suitable logic, circuitry, interfaces, and/or code that may be operable to control and/or manage data processing, routing and/or other application and/or networking operations associated with the VMs 402a, 402b and/or 402c. For example, the host processor 422 may be operable to control and/or manage data processing, routing and/or applications in accordance with information encoded within the packet marks, for example. In this regard, the VMs 402a, 402b, 402c and/or the TVM 402d may be allocated time slices for processing and/or communicating packets and/or packet streams. For example, the VMs 402a, 402b and/or 402c may handle different types of packet streams that may have different latency requirements. In this regard, one packet stream may comprise low latency voice traffic while the other packet streams may comprise web browsing data that may be more tolerant of greater latency. The host processor 422 may allocate earlier time slices to the VM handling the voice packets than to the VMs handling web browsing data.

The host memory 420 may comprise suitable logic, circuitry, and/or code that may be operable to store data utilized by the host system 406. The host memory 420 may be partitioned into a plurality of memory portions. For example, each VM supported by the host system 406 may have a corresponding memory portion or partition in the host memory 420. Moreover, the hypervisor 404 may have a corresponding memory portion in the host memory 420. In this regard, the hypervisor 404 and/or the TVM 402d may enable data communication between VMs by controlling the transfer of data from a portion of the memory 420, which corresponds to one of the VMs, to another portion of the memory 420 that corresponds to another one of the VMs.

The NIC 410 may comprise suitable logic, circuitry, interfaces, and/or code that may enable communication of data via a network. The NIC 410 may enable OSI layer 2 (L2) switching, however, the NIC 410 is not so limited and may, for example, be operable to perform switching based on a higher OSI layer and/or any combination of OSI L2, L3, L4, and/or higher OSI layer protocol switching. Furthermore, additional information, for example, from an administrator as to how to perform the switching may be utilized. The NIC 410 may be referred to as a virtualization-aware NIC because communication with each VM 402 may occur by an independent set of queues.

In instances when the NIC 410 may receive marked packets, the NIC 410 may be operable to spawn a VM and/or select an existing target VM based on various address, port and/or mark information within a received packet. For example, a mark, a destination address and/or a string ID, which are described with respect to FIG. 3a, may indicate how to configure a VM and/or which parameters may be utilized by the VM for processing and/or routing one or more packets.

In instances when a VM may exist for handling a packet and/or packet stream, the NIC 410 may receive a packet with a mark that may indicate which VM should handle processing and/or routing of the packet. For instance, the NIC 410 may receive one or more packets and may parse L2 addressing and/or mark information, such as routing parameters, from the one or more packets. The NIC may determine a target VM for the packets based on the L2 address information. The NIC 410 may transfer the received packets to a receive queue that corresponds to the target VM and/or the L2 address. Furthermore, the NIC processor 418 may utilize any combination of OSI L2, L3, L4 and/or higher layer address and/or port information to select a target VM.

In an exemplary embodiment of the invention, the NIC 410 may enable transfer of marked packets from the VMs to the network by coordinating and/or arbitrating the order in which packets posted for transmission in TX queues may be transmitted. In this regard, the NIC 410 is said to enable direct input/output (I/O) or hypervisor bypass operations. In addition, the NIC 410 may be operable to preempt transmission of one or more packets in order to enable packets and/or packet streams with lower latency requirements to transmit first.

The NIC 410 may, for example, allocate bandwidth limits or allowed frames per VM, and/or may ensure that VMs and/or applications or flows associated with a VM do not claim priority different than that assigned by the hypervisor 404 and/or the TVM 402*d*.

In various embodiments of the invention, the NIC 410 may be a shared resource for the plurality of VMs 402*a*, 402*b* and/or 402*c*. The operations of the VMs 402*a*, 402*b* and/or 402*c* and the NIC 410 may be coordinated by the TVM 402*d* and the hypervisor 404. Exemplary operations of a VM, for example the VM 402*a* and the NIC 410 may comprise copying of data between the VM 402*a* and the NIC 410. This may be accomplished by the NIC 410 when the VM 402*a* communicates to the NIC 410 an address of a buffer or a reference to an address of a buffer to be accessed in the VM 402*a*. The address may be a physical address or a virtual address. A virtual address may be translated to a physical address via, for example, an address translation table or a memory management unit. The means of address translation may be design and/or implementation dependent.

The L2 switch 430 may comprise suitable logic, circuitry, and/or code that may enable the NIC 410 to support packet communication between a VM and the network and/or between VMs, for example. Placing switching functionality in the NIC 410 may, for example, reduce end-to-end latency when transmitting or receiving packets. The L2 switch 430 may support unicast, broadcast, and/or multicast operations. Unicast operations may refer to packet transmissions to a single MAC address. Broadcast operations may refer to packet transmissions to all MAC addresses. Multicast operations may refer to packet transmission to a particular group of MAC addresses.

In an exemplary embodiment of the invention, the VM 402*a* may be operable to send a marked packet to at least one device communicatively coupled to the network. In this instance, the virtual NIC driver 426*a* may transfer the packet to a TX queue corresponding to the VM 402*a*. The L2 switch 430 may receive the packet from the appropriate TX queue and may determine that the destination MAC address or addresses correspond to a device or devices on the network to which data is to be communicated. The NIC 410 may then communicate the packet to the network.

In another exemplary embodiment of the invention, the VM 402*a* may have a data packet to transmit to the VM 402*b* and/or the VM 402*c*. In this instance, the virtual NIC driver 426*a* may place the data packet on a transmit queue corresponding to the VM 402*a*. The L2 switch 430 may receive the data packet from the queue and may determine that the destination MAC address may correspond to the VM 402*b*. The NIC 410 may place, for example, the data packet into a receiver queue corresponding to the VM 402*b*. The virtual NIC driver 426*b* may be notified of the data packet in the queue and the virtual NIC driver 426*b* may copy the data packet for use by an application program running on the VM 402*b*.

The NIC 410 may also comprise the physical address validator 432. The physical address validator 432 may comprise suitable logic, circuitry, and/or code that may enable the validation of the address of a buffer posted by a virtual NIC driver to store a received packet.

In operation, the network device 400 may be configured as an endpoint device, for example, the endpoint device 114. In this regard, the VM 402*c* may function as one or more of a data center, web gaming, voice over IP or uncompressed video services, for example. The VM 402*c* may be operable to encode one or more packets and/or packet streams that may be communicated by the VM 402*c*, with marks comprising routing parameters for the one or more packets. The routing parameters may comprise information, for example, with regard to costs, processing and/or communication of the one or more packets and/or packet streams. For example, the routing parameters may comprise endpoint device capabilities, service class, latency requirements, power consumption cost, shortest path bridging and/or audio video bridging information.

In other embodiments of the invention, the network device 400 may be configured to perform routing functions. The network device 400 may receive one or more packets and/or packet streams comprising marks, for example, the marks encoded with routing parameters by an endpoint device. The marks may indicate how to prioritize and/or otherwise service the packets and/or packet streams. For example, the marks may enable prioritization of packet and/or packet stream routing and/or may enable configuration for processing of the received packets and/or packet streams. The host processor 422 may determine how to best optimize resources for processing and/or routing the marked packets and/or packet streams according to the marked information. Accordingly, the host processor 422 may generate and/or may select one or more virtual machines (VM), for example, one or more of the VMs 402*a*, 402*b* and/or 402*c* to handle the processing and/or communication of the one or more received packets and/or packet streams. In this regard, a specified VM may be configured to handle a specified packet and/or a specified packet stream according to the mark information. The optimization of resources may comprise, for example, determining which and/or how many processing cycles to allocate for each VM, determining which buffers and/or how much memory to allocate to each VM, and choosing a network path for each packet and/or packet stream associated handled by a VM, for example, via the NIC 410 and/or the network infrastructure 106 described with respect to FIG. 1.

The host processor 422 and/or a VM corresponding to one or more received packets and/or packet streams may be operable to utilize information from marks comprising routing parameters for the packets and/or packet stream. The routing parameters may comprise cost information and/or parameters to determine a route and/or processing and/or to prioritize routing for the received packets and/or packet streams. In this regard, mark information comprising one or more of endpoint device capabilities, service class, power consumption, shortest path bridging, audio video bridging may be utilized to determine processing and/or to determine and/or prioritize a route. In addition, one or more costs, for example, power consumption, bandwidth, memory and/or processing costs that may be associated with one or more candidate destination network devices may be utilized. The host processor 422 may be operable to consider trade-offs between routing criteria determined based on mark information and one or more of the costs, for example, power consumption. The tradeoff may be assessed based on, for example, a desired latency, desired bandwidth, an assigned service class, a shortest path and/or a power consumption cost. A VM may be configured to process one or more packets and/or data streams for packet preemption, real time compression, quality measures and/or tier bypass, for example.

Figure 5:
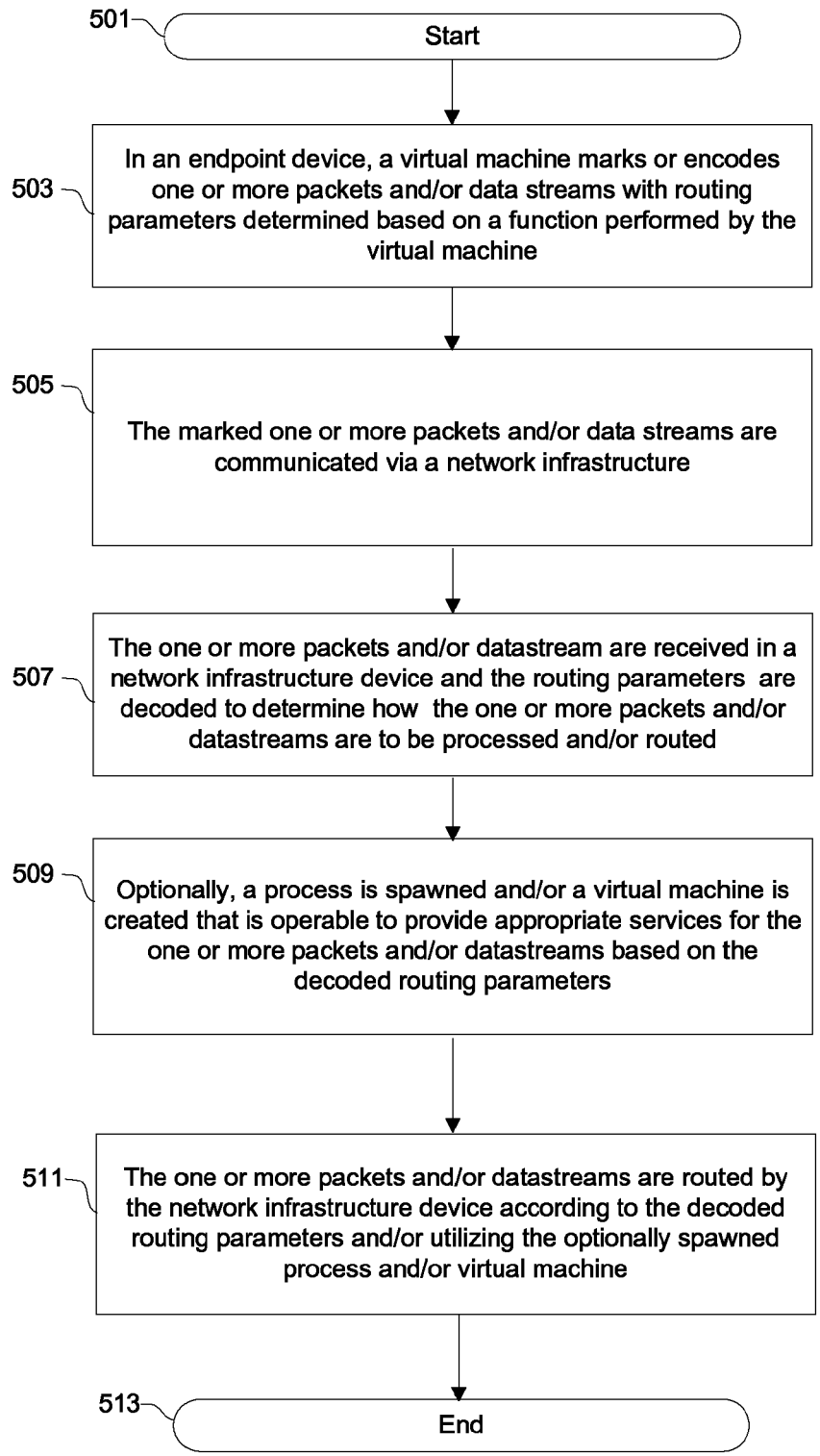
FIG. 5 is a flow chart illustrating exemplary steps for a virtual machine to encode packets with marks comprising routing parameters and communicating packets based on the routing parameters, in accordance with an embodiment of the invention.

FIG. 5 is a flow chart illustrating exemplary steps for a virtual machine to encode packets with marks comprising routing parameters and communicating packets based on the routing parameters, in accordance with an embodiment of the invention. Step 501, is a start step. In step 503, an endpoint device, for example, the endpoint device 112 or 114, may be running a virtual machine that may mark or encode one or more packets and/or data streams with routing parameters specified by the VM. For example, the VM 402a may encode routing parameters within the mark 312 of the packet 300. In step 505, the marked one or more packets and/or data streams are communicated via a network infrastructure, for example, the network infrastructure 106.

In step 507, a network device, for example, the network device 104a or 104b may receive the one or more packets and/or the data stream and may read the routing parameters from the mark 312 information, for example, to determine how to process and/or to route the one or more packets and/or the data streams. In step 509, a host processor may optionally spawn a process and/or create a virtual machine that may be operable to provide appropriate services for the one or more received packets and/or data streams according to the mark 312 information. The network infrastructure 106 device may be configured based on one or more routing parameters within the mark 312 information. In step 511, network infrastructure 106 device may route the one or more packets and/or packet streams according to the mark 312 routing parameters. Step 513, is the end of exemplary steps.

In an embodiment of the invention, a virtual machine (VM), for example, one or more of the VMs 402a, 402b, 402c and/or 402d which may be referred to as a VM 402, that may be running on a network device, for example, the endpoint device 112 and/or 114, may be operable to encode a mark. For example, the mark 312 that may comprise one or more routing parameters may be encoded within one or more initial packets of a packet stream, for example, the packet 300. The routing parameters and/or the mark 312 may indicate services and/or costs to be utilized for processing and/or communicating the packet stream. The virtual machine 402 may communicate the initial packets and/or the packet stream to another network device, for example, the network device 104a or 104b within the network infrastructure 106. The initial packets of the packet stream and/or one or more other packets of the packet stream may be marked by one or more of the endpoint device 112, a client and/or a service provider of the network, for example, by the network device 114. The marks, for example, the mark 312, may comprise information indicating endpoint device capabilities, service class, quality measurements, latency requirements and/or power usage requirements, for example. Moreover, the one or more marks may comprise user information. The costs may comprise information for one or more of capacity, efficiency and/or performance of one or more of power usage, bandwidth, absolute and/or relative latency, frame-drop eligibility, memory and/or processing, for example. However, the invention is not so limited and may utilize any suitable costs.

The initial packets and/or the packet stream may be received by another network device, for example, the network device 112 and/or 114 within the network infrastructure 106, and may be inspected to identify the one or more marks, for example, the mark 312 comprising the routing parameters that may indicate services and/or costs. The indicated services and/or costs may be utilized for processing and/or communicating the initial packet and/or the packet stream, for example, by the network device 112 and/or 104 in the network infrastructure 106. Furthermore, a virtual machine may be initialized and/or configured within the network device 112 and/or 104 to process and/or communicate the initial packets and/or the packet stream based on the marks, for example, the mark 312, based on the routing parameters and/or the indicated services and/or costs. A route may be determined for communicating the initial packets and/or the packet stream based on shortest path bridging, TRILL, and/or audio video bridging. A virtual machine, for example, the virtual machine 402d may implement a firewall for communication of the initial packets and/or the packet stream.

In another embodiment of the invention, a network, for example, the communication system 100 may comprise one or more network devices 104 that may be operable to receive one or more initial packets of a packet stream, for example the packet 300, that may be marked with one or more marks, for example, the mark 312. The one or more marks may indicate services to be utilized for processing and/or communicating one or more other packets of the packet stream. The initial packets of the packet stream may be inspected and the marks within the packets may be identified. A virtual machine, for example, one or more of the virtual machines 402 may be initialized in the network device 104a, for example, wherein the virtual machine 402a, for example, may provide the required services. Furthermore, one or more other packets of the packet stream may be processed and/or communicated via the virtual machine 402a. The packets may be marked by one or more of an endpoint device, for example, the endpoint device 112, by a VM, by a client and/or by a service provider, for example, by the endpoint device 114. In this regard, the marks may comprise user information. Moreover, the marks may comprise information for endpoint device capabilities, service class, quality measurements, latency requirements and/or power usage requirements. The one or more virtual machines, for example, the virtual machine 402a may be configured for processing and/or the communicating the packets of the packet stream based on information within the marks.

In various embodiments of the invention, the virtual machines 402 may be configured for processing and/or communicating based on one or more routing parameters and/or one or more costs associated with one or more other network devices, for example, one or more of the network devices 104. In this regard, the costs may comprise information for capacity, efficiency and/or performance of one or more of power usage, bandwidth, memory and/or processing. A route may be determined for communicating the packets of the packet stream via the virtual machine 402a, for example. In an exemplary embodiment of the invention, the route may be determined based on one or more of shortest path bridging and audio video bridging. In another exemplary embodiment, the one or more virtual machines may be operable to implement a firewall.

In another embodiment of the invention, one or more processors and/or circuits in one or more of a plurality network devices, for example, the network devices 104 may generate and/or select one or more virtual machines (VM), for example, one or more of the VMs 402, for processing and/or routing one or more packets, for example, packet 300, and/or packet streams based on one or more corresponding marks, for example, the mark 312 within the packets and/or packet streams. The one or more VMs 402, may determine one or more routes over which the one or more packets and/or packet streams are to be communicated between a first network device, for example the network device 104a of the plurality of network devices 104 and a second network device, for example, the network device 104b of the plurality of network devices 104 based on the corresponding marks 312 within the packets 300 and/or packet streams, and based one or more routing parameters and/or one or more costs associated with utilizing the determined one or more routes. The costs may comprise information for capacity, efficiency and/or performance of power usage, bandwidth, memory and/or processing.

The one or more VMs may select a route from the determined one or more routes for communicating the one or more packets 300 and/or the packet streams between the first network device 104a and the second network device 104b. Furthermore, the one or more VMs 402 may communicate the packets 300 and/or packet streams between the first network device 104a and the second network device 104b via the selected one or more routes. In this regard, one or more initial packets of the packets and/or packet streams, for example, the packet 300, may comprise the corresponding marks 312. The packets 300 and/or the packet streams may be parsed and/or inspected. In addition, the one or more corresponding marks 312 may be parsed and/or inspected.

The VMs 402 may be configured for processing the one packets and/or packet streams, for example, the packet 300 based on information within the corresponding marks 312. The corresponding marks 312 may comprise information for one or more of user device capabilities, service class, quality measurements, latency requirements and power usage requirements. The corresponding marks 312 may be inserted within the packets and/or packet streams, for example, the packet 300 by one or more of an endpoint device, for example, the endpoint device 102, 108, 112 and/or 114, a VM running on the endpoint device, by a client and/or a service provider, for example. One or more routes over which the packets may be communicated between the first network device 402a of the plurality of network devices 402 and the second network device 402b of the plurality of network devices 402 may be determined and/or selected based on one or more of shortest path bridging (SPB) and audio video bridging (AVB). Furthermore, one or more routes may be determined and/or selected based on corresponding one or more marks 312 within the packets and/or packet streams, for example, the packet 300, the routing parameters and/or the costs. The one or more routing parameters and/or costs may be received and/or discovered from the plurality of communication devices 104, for example. The VMs 402 and/or the processing may implement a firewall for communication of the packets and/or packet streams, for example, the packet 300.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for network aware virtual machines.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
performing by one or more circuits in a network device within a network:
encoding by a first virtual machine running on said network device, a first mark, comprising one or more routing parameters, within one or more initial packets of a first packet stream that indicate services and/or costs to be utilized for processing and/or communicating said first packet stream;
encoding by a second virtual machine running on said network device, a second mark, comprising one or more routing parameters, within one or more initial packets of a second packet stream that indicate services and/or costs to be utilized for processing and/or communicating said second packet stream;
transmitting said one or more initial packets of said first packet stream and/or said one or more initial packets of said second packet stream through the network.

2. The method according to claim 1, comprising marking said one or more initial packets of said first packet stream and/or one or more other packets of said first packet stream by one or more of an endpoint device, a client and/or a service provider of said network.

3. The method according to claim 1, wherein said first mark comprises information indicating one or more of endpoint device capabilities, service class, quality measurements, and/or latency requirements.

4. The method according to claim 1, wherein said first mark comprises user information.

5. The method according to claim 1, wherein said costs comprise information for one or more of capacity of the network device and/or another network device, efficiency and/or performance of one or more of bandwidth, absolute and/or relative latency, frame-drop eligibility, memory of the network device and/or another network device and processing.

6. The method according to claim 1, wherein said one or more initial packets of said first packet stream are received by another network device and inspected to identify said first mark comprising said one or more routing parameters that indicate said services and/or costs.

7. The method according to claim 1, wherein said indicated services and/or costs are utilized for processing and/or communicating said one or more initial packets of said first packet stream.

8. The method according to claim 1, wherein a virtual machine is initialized and/or configured to process and/or communicate said one or more initial packets of said first packet stream based on said first mark, said routing parameters of said first mark and/or said indicated services and/or costs of said first mark.

9. The method according to claim 1, wherein a route is determined for said communicating said one or more initial packets of said packet stream based on one or more of shortest path bridging, Transparent Interconnection of Lots of Links (TRILL), and audio video bridging.

10. The method according to claim 1, wherein a virtual machine implements a firewall for said one or more initial packets of said first packet stream.

11. A system for communication, the system comprising:
one or more processors and/or circuits in a network device of a network, wherein said one or more processors and/or circuits are operable to:
encode by a first virtual machine running on said network device, a first mark, comprising one or more routing parameters, within one or more initial packets of a first packet stream that indicate services and/or costs to be utilized for processing and/or communicating said first packet stream;
encode by a second virtual machine running on said network device, a second mark, comprising one or more routing parameters, within one or more initial packets of a second packet stream that indicate services and/or costs to be utilized for processing and/or communicating said second packet stream;
transmit said one or more initial packets of said first packet stream and/or said one or more initial packets of said second packet stream through the network.

12. The system according to claim 11, wherein said one or more processors and/or circuits is operable to mark said one or more initial packets of said first packet stream and/or one or more other packets of said first packet stream by one or more of an endpoint device, a client and/or a service provider of said network.

13. The system according to claim 11, wherein said first mark comprises information indicating one or more of endpoint device capabilities, service class, quality measurements, and/or latency requirements.

14. The system according to claim 11, wherein said first mark comprises user information.

15. The system according to claim 11, wherein said costs comprise information for one or more of capacity of the network device and/or another network device, efficiency and/or performance of one or more of bandwidth, absolute and/or relative latency, frame-drop eligibility, memory of the network device and/or another network device and processing.

16. The system according to claim 11, wherein said one or more initial packets of said first packet stream are received by another network device and inspected to identify said first mark comprising said one or more routing parameters that indicate said services and/or costs.

17. The system according to claim 11, wherein said indicated services and/or costs are utilized for processing and/or communicating said one or more initial packets of said first packet stream.

18. The system according to claim 11, wherein a virtual machine is initialized and/or configured to process and/or communicate said one or more initial packets of said first packet stream based on said first mark, said routing parameters of said first mark and/or said indicated services and/or costs of said first mark.

19. The system according to claim 11 wherein a route is determined for said communicating said one or more initial packets of said packet stream based on one or more of shortest path bridging, Transparent Interconnection of Lots of Links (TRILL), and audio video bridging.

20. The system according to claim 11, wherein a virtual machine implements a firewall for said one or more initial packets of said first packet stream.

\* \* \* \* \*